(12) United States Patent
Sagawa

(10) Patent No.: US 8,169,394 B2
(45) Date of Patent: May 1, 2012

(54) IMAGE OUTPUT APPARATUS, PROJECTOR, AND METHOD OF CONTROLLING IMAGE OUTPUT APPARATUS

(75) Inventor: Takahiro Sagawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 457 days.

(21) Appl. No.: 12/470,032

(22) Filed: May 21, 2009

(65) Prior Publication Data

US 2009/0290075 A1    Nov. 26, 2009

(30) Foreign Application Priority Data

May 22, 2008   (JP) ................................. 2008-134623

(51) Int. Cl.
*G09G 3/36* (2006.01)
(52) U.S. Cl. .......................................... 345/98; 345/204
(58) Field of Classification Search ..................... 345/87, 345/94, 98, 204
See application file for complete search history.

(56) References Cited

U.S. PATENT DOCUMENTS

| 6,011,533 A * | 1/2000 | Aoki ................................ 345/92 |
| 2005/0099374 A1* | 5/2005 | Sagawa ........................... 345/87 |
| 2006/0055654 A1* | 3/2006 | Sagawa et al. ................... 345/98 |

FOREIGN PATENT DOCUMENTS

| JP | 05150751 A  *  | 6/1993 |
| JP | A-5-150751 | 6/1993 |
| JP | B2-3451827 | 9/2003 |

\* cited by examiner

*Primary Examiner* — Amare Mengistu
*Assistant Examiner* — Premal Patel
(74) *Attorney, Agent, or Firm* — Oliff & Berridge, PLC

(57) ABSTRACT

An image output apparatus includes: a display device having a light modulation section which is divided into a plurality of channels; a level adjusting unit that is provided to each of the channels, adjusts a level of input signal, and outputs adjusted output signal to corresponding channel; a signal switching unit that switches between a video input signal and a first reference signal as the input signal of the level adjusting unit, for a predetermined period; an adjustment amount correcting unit that compares an output signal from each of the level adjusting units with a second reference signal for the predetermined period and corrects the adjustment amounts of the corresponding level adjusting units on the basis of the comparison results; and a connection state switching unit that outputs a control instruction to the display device to change a state of the channels to an open state for the predetermined period.

9 Claims, 4 Drawing Sheets

IMAGE OUTPUT APPARATUS, PROJECTOR, AND METHOD OF CONTROLLING IMAGE OUTPUT APPARATUS

The entire disclosure of Japanese Patent No. 2008-134623 filed May 22, 2008 is expressly incorporated by reference herein.

BACKGROUND

1. Technical Field

The present invention relates to an image output apparatus, a projector including the image output apparatus, and a method of controlling the image output apparatus.

2. Related Art

For example, in a liquid crystal display, since there are a large number of pixels in a horizontal direction, a light modulation section filled with the pixels, is divided into a plurality of channels in the horizontal direction, and the divided channels are driven. In an image output apparatus connected to the liquid crystal display having the above-mentioned structure, it is necessary to make the output levels of output circuits provided for each channel equal to each other in order to prevent the occurrence of display irregularity.

Therefore, JP-A-5-150751 discloses a structure that can adjust the levels of output circuits provided for each channel. Specifically, in the structure, a reference signal is input to each of the output circuits, the output of each of the output circuits is compared with predetermined reference data, and the level adjustment amounts of the corresponding output circuits are corrected on the basis of the comparison results.

However, in the related art, since the output circuits are connected to signal lines of an active matrix unit of the liquid crystal display, the load of an output side of each of the output circuits varies due to the operation of the liquid crystal display. As a result, the output of each of the output circuits varies due to the operation of the liquid crystal display, which makes it difficult to accurately correct the level adjustment amount.

SUMMARY

An advantage of some aspects of the invention is that it improves the accuracy of correcting the level adjustment amount of each output circuit and sufficiently reducing display irregularity.

According to a first aspect of the invention, there is provided an image output apparatus. The image output apparatus includes: a display device having a light modulation section which is divided into a plurality of channels; a level adjusting unit that is provided to each of the channels, adjusts a level of input signal, and outputs adjusted output signal to corresponding channel; a signal switching unit that switches between a video input signal and a first reference signal as the input signal of the level adjusting unit, for a predetermined period; an adjustment amount correcting unit that compares an output signal from each of the level adjusting units with a second reference signal for the predetermined period and corrects the adjustment amounts of the corresponding level adjusting units on the basis of the comparison results; and a connection state switching unit that outputs a control instruction to the display device to change a state of the channels to an open state for the predetermined period.

In the image output apparatus, for a predetermined period, the first reference signal is input to each of the level adjusting units, the output signal from each of the level adjusting units is compared with the second reference signal, and the adjustment amounts of the corresponding level adjusting units are corrected on the basis of the comparison results. In addition, in the image output apparatus, for the predetermined period, the control instruction to change the state of the channels to the open state is output to the display device. Therefore, in the image output apparatus according to the first aspect, for a predetermined period for which the level adjustment amount is corrected, each of the level adjusting units is not electrically connected to the display device. Therefore, the load of an output side of each of the level adjusting units does not vary due to the operation of the display device. As a result, the image output apparatus can accurately correct a level adjustment amount, and it is possible to sufficiently reduce the display irregularity of the display device.

According to a second aspect of the invention, in the image output apparatus according to the first aspect, the display device may include: an active matrix unit that has a plurality of scanning lines extending in one direction and a plurality of signal lines extending in another direction arranged in a matrix on a substrate, and pixel electrodes and switching elements formed at intersections of the scanning lines and the signal lines; a plurality of connection lines that classify the plurality of signal lines into the number of channels; a plurality of connection terminals that are connected to the connection lines; and a plurality of connection line conduction switches that are provided to correspond to the plurality of connection lines and control electrical connection to the connection terminals. The connection state switching unit may output a control instruction to change the connection line conduction switches to an open state to the display device.

According to the image output apparatus of the second aspect, for the predetermined period, a control instruction to change connection (conduction) to a plurality of signal lines provided in a display panel of the display device to an open state, that is, a high impedance state is output. Therefore, in the image output apparatus according to the second aspect, for a predetermined period for which the level adjustment amount is corrected, the level adjusting units are not electrically connected to the plurality of signal lines. Therefore, the load of an output side of each of the level adjusting units does not vary due to the operation of the display device. As a result, the image output apparatus can accurately correct a level adjustment amount, and it is possible to sufficiently reduce the display irregularity of the display device.

According to a third aspect of the invention, the image output apparatus according to the second aspect may further include a display timing generating unit. The display device may further include an enable signal terminal that receives an enable signal for controlling the on/off states of the plurality of connection line conduction switches. The display timing generating unit may output the enable signal to the enable signal terminal, and the connection state switching unit of the image output apparatus may include a first off switching unit that changes the enable signal to an inactive level for the predetermined period.

According to the image output apparatus of the third aspect, it is possible to turn off all the connection line conduction switches by changing the enable signal transmitted to an active matrix display device to an inactive level. Therefore, it is possible to simplify the structure of the connection state switching unit.

According to a fourth aspect of the invention, in the image output apparatus according to the third aspect, the display device may further include a precharge timing signal terminal that receives a pre-charge timing signal for controlling the on/off states of the plurality of connection line conduction switches. The display timing generating unit may include a unit that outputs the pre-charge timing signal to the pre-charge timing signal terminal. The connection state switching unit of the image output apparatus may include a second off switching unit that changes the pre-charge timing signal to an inactive level for the predetermined period.

According to the image output apparatus of the fourth aspect, in the display device that transmits a pre-charge voltage to the signal lines for a pre-charge period, it is possible to turn off all the connection line conduction switches by changing the pre-charge timing signal transmitted to the display device to an inactive level.

According to a fifth aspect of the invention, the image output apparatus according to the fourth aspect may further include an adjustment amount correction mode signal output unit that outputs an adjustment amount correction mode signal indicating whether it is the predetermined period. The first off switching unit may be a first AND circuit having a first input terminal connected to an enable signal output terminal of the display timing generating unit, a second input terminal connected to an output terminal of the adjustment amount correction mode signal output unit, and an output terminal connected to the enable signal terminal. The second off switching unit may be a second AND circuit having a first input terminal connected to a pre-charge timing signal output terminal of the display timing generating unit, a second input terminal connected to the output terminal of the adjustment amount correction mode output unit, and an output terminal connected to the pre-charge timing signal terminal.

According to the image output apparatus of the fifth aspect, it is possible to form the connection state switching unit with a simple structure, such as the first and second AND circuits.

According to a sixth aspect of the invention, in the image output apparatus according to any one of the first to fifth aspects, the predetermined period may be within a vertical retrace period. According to this structure, it is possible to correct a level adjustment amount without any influence on an image displayed by the display device.

According to a seventh aspect of the invention, in the image output apparatus according to any one of the first to sixth aspects, each of the level adjusting units may include a digital/analog converter that converts the video input signal, which is a digital signal, into an analog signal, and adjust at least one of the gain and the offset of the digital/analog converter to adjust a level.

According to the image output apparatus of the seventh aspect, it is not necessary to provide a dedicated level correcting circuit, which results in a simple structure.

According to an eighth aspect of the invention, a projector includes: the image output apparatus according to any one of the first to seventh aspects.

According to the projector of the eighth aspect, it is possible to provide a projector having various effects described in the first to seventh aspects.

According to a ninth aspect of the invention, there is provided a method of controlling an image output apparatus that outputs video signals to a display device dividing a light modulation section into a plurality of channels and driving the divided channels and includes a plurality of level adjusting units which are provided for each channel, adjust the levels of video input signals for each channel, and output the adjusted output signals to connection terminals for each channel of the display device. The method includes: outputting a control instruction to change each of the connection terminals to an open state to the display device for a predetermined period; inputting a first reference signal to each of the level adjusting units, instead of the video input signal, for the predetermined period; and comparing an output signal from each of the level adjusting units with a second reference signal for the predetermined period and correcting the adjustment amounts of the corresponding level adjusting units on the basis of the comparison results.

According to the method of controlling an image output apparatus, similar to the image output apparatus, it is possible to accurately correct the level adjustment amount of each channel. Therefore, it is possible to sufficiently reduce the display irregularity of the display device.

According to a tenth aspect of the invention, there is provided an image output apparatus for outputting video signals to a display device that divides a screen forming an image into a plurality of channels and drives the divided channels. The image output apparatus includes: a plurality of level adjusting units that are provided for each channels adjust the levels of input signals, and output adjusted output signals to connection terminals for each channel of the display device; a signal switching unit that switches between a video input signal and a first reference signal as the input signal of the level adjusting units of each channel, for a predetermined period; and an adjustment amount correcting unit that compares an output signal from each of the level adjusting units with a second reference signal for the predetermined period and corrects the adjustment amounts of the corresponding level adjusting units on the basis of the comparison results. Each of the level adjusting units includes a digital/analog converter that converts the video input signal, which is a digital signal, into an analog signal, and adjusts at least one of the gain and the offset of the digital/analog converter to adjust a level.

According to the image output apparatus of the tenth aspects it is not necessary to provide a dedicated level correcting circuit, which results in a simple structure.

According to an eleventh aspect of the invention, in the image output apparatus according to the tenth aspect, a unit that adjusts the gain and the offset may adjust at least one of an upper limit reference voltage and a lower limit reference voltage supplied to the digital/analog converter.

According to the image output apparatus of the eleventh aspect, it is not necessary to provide a dedicated gain and offset adjusting unit, which results in a simple structure.

The invention can include various embodiments. For example, the invention can applied to an image output system, a computer program for implementing the function of the image output apparatus, a recording medium having the computer program recorded thereon, and data signals that include the computer program and are carried on a carrier wave.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, exemplary embodiments of the invention will be described with reference to examples.

Figure 1:
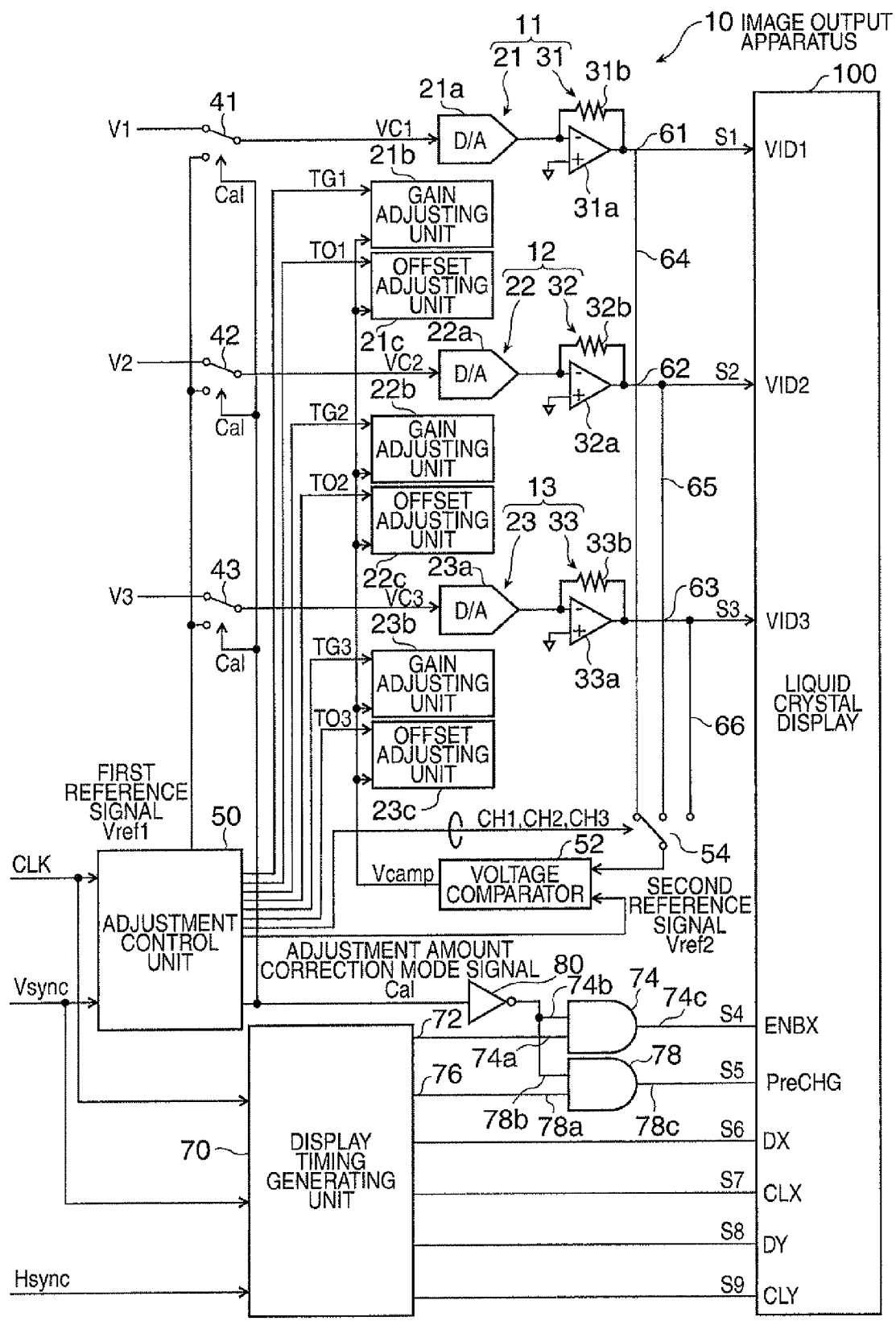
FIG. 1 is a circuit diagram illustrating the structure of an image output apparatus according to an embodiment of the invention.
Figure 2:
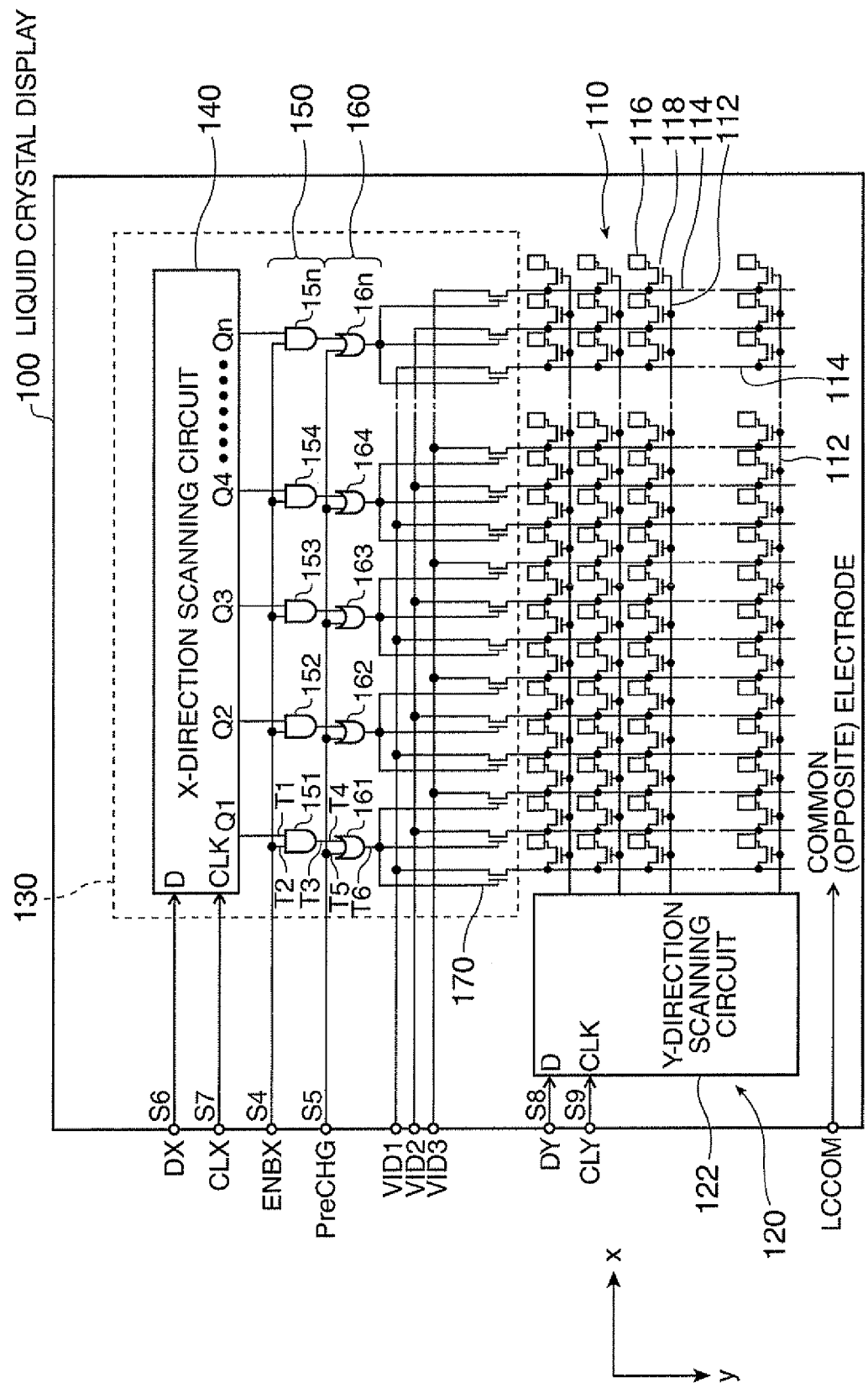
FIG. 2 is a circuit diagram illustrating a liquid crystal display connected to the image output apparatus.

FIG. 1 is a circuit diagram illustrating the structure of an image output apparatus 10 according to an embodiment of the invention. FIG. 2 is a circuit diagram illustrating a liquid crystal display 100, serving as a liquid crystal display device, connected to the image output apparatus 10. First, the liquid crystal display 100 will be described.

A. Structure of Liquid Crystal Display

The liquid crystal display 100 adopts an active matrix driving method. As shown in FIG. 2, the liquid crystal display 100 includes a liquid crystal panel 110 that displays an image, a scanning line driving circuit 120 that drives the liquid crystal panel 110, and a signal line driving circuit 130 that drives the liquid crystal panel 110.

The liquid crystal panel 110 includes an array substrate (not shown). A plurality of scanning lines 112 extending in an X direction (hereinafter, referred to as a "horizontal direction") and a plurality of signal lines 114 extending in a Y direction (hereinafter, referred to as a "vertical direction") are arranged in a matrix on the array substrate, and pixel electrodes (pixel pattern) 116, which are transparent electrodes, and thin film transistors (TFTs) 118, serving as switching elements, are formed at intersections of the scanning lines and the signal lines. Each of the TFTs 118 has a gate electrode connected to the scanning line 112, a source electrode connected to the signal line 114, and a drain electrode connected to the pixel electrode 116. In this way, an active matrix unit including the scanning lines 112, the signal lines 114, the pixel electrodes 116, and the TFTs 118 is formed on the substrate.

Although not shown in the drawings, the liquid crystal panel 110 further includes an opposite substrate that is opposite to the array substrate having the above-mentioned structure and has an opposite electrode formed thereon, and a liquid crystal material is provided between the array substrate and the opposite substrate with alignment films interposed therebetween.

The scanning line driving circuit 120 includes a Y-direction scanning circuit 122. The Y-direction scanning circuit 122 is connected to the scanning lines 112 of the liquid crystal panel 110. The Y-direction scanning circuit 122 receives a vertical start signal S8 and a vertical clock signal S9 transmitted from the outside of the liquid crystal display 100, and scans the active matrix unit in the vertical direction on the basis of the vertical start signal S8 and the vertical clock signal S9 to sequentially select the scanning lines 112.

The signal line driving circuit 130 is connected to the signal lines 114 of the liquid crystal panel 110. The signal line driving circuit 130 includes an X-direction scanning circuit 140, an enable control unit 150, and a pre-charge driving circuit 160.

The X-direction scanning circuit 140 receives a horizontal start signal S6 and a horizontal clock signal S7 transmitted from the outside of the liquid crystal display 100, and scans the active matrix unit in the horizontal direction on the basis of the horizontal start signal S6 and the horizontal clock signal S7 to sequentially select the signal lines 114.

The enable control unit 150 includes n (n is a positive integer) AND circuits 151, 152, ..., 15n, and the first input terminals T1 of the AND circuits 151 to 15n are connected to n output terminals Q1, Q2, ..., Qn of the X-direction scanning circuit 140, respectively. The second input terminals T2 of the AND circuits 151 to 15n are connected to an enable signal terminal ENBX, which is one of the connection terminals of the liquid crystal display 100, through one line. The output terminals T3 of the AND circuits 151 to 15n are connected to OR circuits, which will be described below, of the pre-charge driving circuit 160.

The pre-charge driving circuit 160 includes n OR circuits 161, 162, ..., 16n, and the output terminals T3 of the AND circuits 151 to 15n are connected to the first input terminals T4 of the OR circuits 161 to 16n. The second input terminals T5 of the OR circuits 161 to 16n are connected to a pre-charge timing signal terminal PreCHG, which is one of the connection terminals of the liquid crystal display 100, through one line.

Each of the output terminals T3 of the OR circuits 161 to 16n is branched into three lines, and TFTs 170 that are the same as the switching elements formed on the liquid crystal panel 110 are connected to the branch lines. Specifically, each of the branch lines is connected to a gate electrode of the TFT 170. The TFT 170 is referred to as a "scanning TFT" to be discriminated from the TFT 118 formed on the liquid crystal panel 110. The TFT 118 formed on the liquid crystal panel 110 is referred to as a "pixel TFT". The scanning TFT 170 is a "connection line conduction switch".

A drain electrode of the scanning TFT 170 is connected to the corresponding signal line 114 of the liquid crystal panel 110. That is, the number of scanning TFTs 170 is equal to that of signal lines 114. Therefore, since the number of scanning TFTs 170 is 3×n, the number of signal lines 114 is also 3×n. That is, n is one-third of the number of signal lines. In other words, n is one-third of the number of signal lines such that the liquid crystal panel 110 is divided into three parts in the horizontal direction and the three parts are driven.

Each group of the scanning TFTs 170 connected to the same one of the OR circuits 161 to 16n can be divided into a scanning TFT for a first channel, a scanning TFT for a second channel, and a scanning TFT for a third channel. In the groups of the scanning TFTs, the scanning TFTs for the same channel are connected to one line, and lines in each group are connected to analog video terminals VID1, VID2, and VID3 of the liquid crystal display 100.

According to the liquid crystal display 100 having the above-mentioned structure, the Y-direction scanning circuit 120 selects the scanning lines 112 and the X-direction scanning circuit 140 selects the signal lines 114 to transmit electric signals from the analog video terminals VID1, VID2, and VID3 to a desired pixel TFT 118. As a result, in the liquid crystal display 100, only the liquid crystal in a region interposed between the pixel electrode and the opposite electrode corresponding to the pixel TFT 118 receives an electric field between the electrodes and the alignment of the liquid crystal is changed. Therefore, the liquid crystal serves as a liquid crystal shutter for each pixel. In addition, according to the liquid crystal display 100, since a horizontal write enable signal S4 is input to the enable signal terminal ENBX, it is possible to validate output signals from the output terminals Q1, Q2, ..., Qn of the X-direction scanning circuit 140. Since a pre-charge timing signal S5 is input to the pre-charge timing signal terminal PreCHG, it is possible to apply a pre-charge voltage to each of the signal lines 114 for a pre-charge period determined by the pre-charge timing signal S5.

B. Structure of Image Output Apparatus

As shown in FIG. 1, the image output apparatus 10 is connected to the liquid crystal display 100. The image output apparatus 10 transmits video signals through three channels, that is, the first channel (channel 1), the second channel (channel 2), and the third channel (channel 3), and performs a desired amplifying process on the video signals for the three channels that are output from an image processing circuit (not shown). The video signals for the three channels are referred to as first to third digital video input signals V1, V2, and V3. The first to third digital video input signals V1, V2, and V3 are converted into analog signals by D/A converting units 21, 22, and 23 and then amplified at a predetermined amplification ratio by amplifying units 31, 32, and 33, respectively. That is, the D/R converting units 21, 22, and 23 and the amplifying units 31, 32, and 33 for each channel form level adjusting units 11, 12, and 13 that adjust input levels, respectively.

The amplifying units 31, 32, and 33 include operational amplifiers 31a, 32a, and 33a and resistors 31b, 32b, and 33b, respectively. The amplifying units 31, 32, and 33 have the same amplification ratio in terms of specifications. The output signals of the amplifying units 31, 32, and 33 are input as analog video output signals S1, S2, and S3 to the analog video terminals VID1, VID2, and VID3 of the liquid crystal display 100, respectively. If it is necessary to discriminate the channels of the "level adjusting units", the "D/A converting units", the "amplifying units", the "analog video output signals", and the "analog video terminals", ordinal numbers, such as "first", "second", and "third", are given to them.

As described above, the amplifying units 31, 32, and 33 have the same amplification ratio in terms of specifications, but strictly, the amplification ratios are different from each other due to individual difference or ambient temperature. In order to correct the difference between the amplification ratios, the D/A converting units 21, 22, and 23 include D/A converters 21a, 22a, and 23a that perform digital/analog conversion, gain adjusting units 21b, 22b, and 23b that adjust the gains of the D/A converters 21a, 22a, and 23a, and offset adjusting units 21c, 22c, and 23c that adjust the offsets of the D/A converters 21a, 22a, and 23a, respectively. A unit using a combination of an up/down counter and an R-2R D/A converter may be used as an example of the gain adjusting units 21b, 22b, and 23b and the offset adjusting units 21c, 22c, and 23c. In this case, it is possible to reduce costs.

Input switches 41, 42, and 43 are provided in the front stages of the D/A converting units 21, 22, and 23, respectively. The input switches 41, 42, and 43 perform switching between a first state that transmits the first to third digital video input signals V1, V2, and V3 to the D/A converting units 21, 22, and 23 and a second state that transmits a first reference signal Vref1 instead of the digital video input signals V1, V2, and V3 to the D/A converting units 21, 22, and 23. Specifically, each of the input switches 41, 42, and 43 receives an adjustment amount correction mode signal Cal. When the adjustment amount correction mode signal Cal is at a low level, that is, in an image display mode, each of the input switches performs switching to the first state. When the adjustment amount correction mode signal Cal is at a high level, that is, in an adjustment amount correction mode, each of the input switches performs switching to the second state.

The first reference signal Vref1 is input from an adjustment control unit 50 to each of the input switches 41 to 43. The adjustment control unit 50 outputs the adjustment amount correction mode signal Cal to each of the input switches 41 to 43. In addition, the adjustment control unit 50 outputs control signals TG1, TG2, and TG3 for defining correction timing to the gain adjusting units 21b, 22b, and 23b of the D/A converting units 21, 22, and 23, and outputs control signals TO1, TO2, and TO3 for defining correction timing to the offset adjusting units 21c, 22c, and 23c, respectively. Further, the adjustment control unit 50 outputs a second reference signal Vref2 to a voltage comparator 52, which will be described below. The adjustment control unit 50 receives a clock signal CLK and a vertical synchronization signal Vsync, and controls the gain adjusting units 21b, 22b, and 23b and the offset adjusting units 21c, 22c, and 23c. Therefore, the adjustment control unit 50 is composed of a so-called microcomputer or logic circuit. An adjustment amount correcting process performed by the microcomputer will be described below.

Branch lines 64, 65, and 66 are connected to connection lines 61, 62, and 63 that connect the amplifying units 31, 32, and 33 to the analog video terminals VID1, VID2, and VID3, respectively, and the other ends of the branch lines 64, 65, and 66 are connected to an output switch 54. The output switch 54 is electrically connected to the voltage comparator 52. The output switch 54 selects one of the analog video output signals S1, S2, and S3 transmitted from the analog video terminals VID1, VID2, and VID3, and transmits the selected signal to the voltage comparator 52. In addition, the output switch 54 receives a first channel instruction CH1 corresponding to channel 1, a second channel instruction CH2 corresponding to channel 2, and a third channel instruction CH3 corresponding to channel 3 from the adjustment control unit 50, and selects the analog video output signals S1, S2, and S3 on the basis of the first to third instructions CH1 to CH3. That is, when the first channel instruction CH1 is at a high level, the output switch 54 selects the first analog video output signal S1. When the second channel instruction CH2 is at a high level, the output switch 54 selects the second analog video output signal S2. When the third channel instruction CH3 is at a high level, the output switch 54 selects the third analog video output signal S3.

The voltage comparator 52 compares the voltages of the analog video output signal S1, S2, and S3 transmitted from the output switch 54 with the second reference signal Vref2 transmitted from the adjustment control unit 50, and determines voltage levels. The voltage comparator 52 outputs a comparison output signal Vcomp indicating the determined voltage levels to the gain adjusting units 21b, 22b, and 23b and the offset adjusting units 21c, 22c, and 23c of the D/A converting units 21, 22, and 23.

The gain adjusting units 21b, 22b, and 23b determine an adjustment direction on the basis of the comparison output signal Vcomp transmitted from the voltage comparator 52, and adjusts the gains (amplification ratios) of the amplifying units 31, 32, and 33 at times corresponding to the timing signals TG1, TG2, and TG3 transmitted from the adjustment control unit 50. That is, when it is determined that the analog video output signal S1, S2, and S3 are higher than the second reference signal Vref2, the gain adjusting units 21b, 22b, and 23b adjust the gain such that the gain is decreased by one step. On the other hand, when it is determined that the analog video output signal S1, S2, and S3 are lower than the second reference signal Vref2, the gain adjusting units 21b, 21b, and 23b adjust the gain such that the gain is increased by one step.

The offset adjusting units 21c, 22c, and 23c determine an adjustment direction (an increasing direction or a decreasing direction) on the basis of the comparison output signal Vcomp transmitted from the voltage comparator 52, and adjust the offsets of the amplifying units 31, 32, and 33 at times corresponding to the timing signals TO1, TO2, and TO3 transmitted from the adjustment control unit 50. That is, when it is determined that the analog video output signal S1, S2, and S3 are higher than the second reference signal Vref2, the offset adjusting units 21c, 22c, and 23c adjust the offset such that the offset is decreased by one step. On the other hand, when it is determined that the analog video output signal S1, S2, and S3 are lower than the second reference signal Vref2, the offset adjusting units 21c, 22c, and 23c adjust the offset such that the offset is increased by one step.

The image output apparatus 10 further includes a display timing generating unit 70. Since the display timing generating unit 70 has a known structure, a detailed description thereof will be omitted. Briefly, the display timing generating unit 70 generates the horizontal write enable signal S4, the pre-charge timing signal S5, the horizontal start signal S6, the horizontal clock signal S7, the vertical start signal S8, and the vertical clock signal S9 on the basis of the clock signal CLK, the vertical synchronization signal Vsync, and the horizontal synchronization signal Hsync, and outputs these signals S4 to S9 to the liquid crystal display 100.

A first AND circuit 74 is provided on a transmission line 72 through which the horizontal write enable signal S4 is transmitted from the display timing generating unit 70. Specifically, the upstream side of the transmission line 72 is connected to a first input terminal 74a of the first AND circuit 74, and the downstream side of the transmission line 72 is connected to an output terminal 74c of the first AND circuit 74. A second input terminal 74b of the first AND circuit 74 is connected to an output terminal of an inverter 80 that inverts the high or low level of the adjustment amount correction mode signal Cal transmitted from the adjustment control unit 50.

A second AND circuit 78 is provided on a transmission line 76 through which the pre-charge timing signal S5 is transmitted from the display timing generating unit 70. Specifically, the upstream side of the transmission line 76 is connected to a first input terminal 78a of the second AND circuit 78, and the downstream side of the transmission line 76 is connected to an output terminal 78c of the second AND circuit 78. A second input terminal 78b of the second AND circuit 78 is connected to the output terminal of the inverter 80.

Therefore, when the adjustment amount correction mode signal Cal is at a low level (during the image display mode), the second input terminal 74b of the first AND circuit 74 and the second input terminal 78b of the second AND circuit 78 are changed to a high level. Therefore, the horizontal write enable signal S4 and the pre-charge timing signal S5 output from the display timing generating unit 70 are respectively transmitted to the enable signal terminal ENBX and the pre-charge timing signal terminal PreCHG of the liquid crystal display 100 without any change. On the other hand, when the adjustment amount correction mode signal Cal is at a high level (during the adjustment amount correction mode), the second input terminal 74b of the first AND circuit 74 and the second input terminal 78b of the second AND circuit 78 are changed to a low level. Therefore, the first AND circuit 74 and the second AND circuit 78 prevent the transmission of the enable signal S4 and the pre-charge timing signal S5 to the enable signal terminal ENBX and the pre-charge timing signal terminal PreCHG of the liquid crystal display 100, respectively.

C. Adjustment Amount Correcting Process

Figure 3:
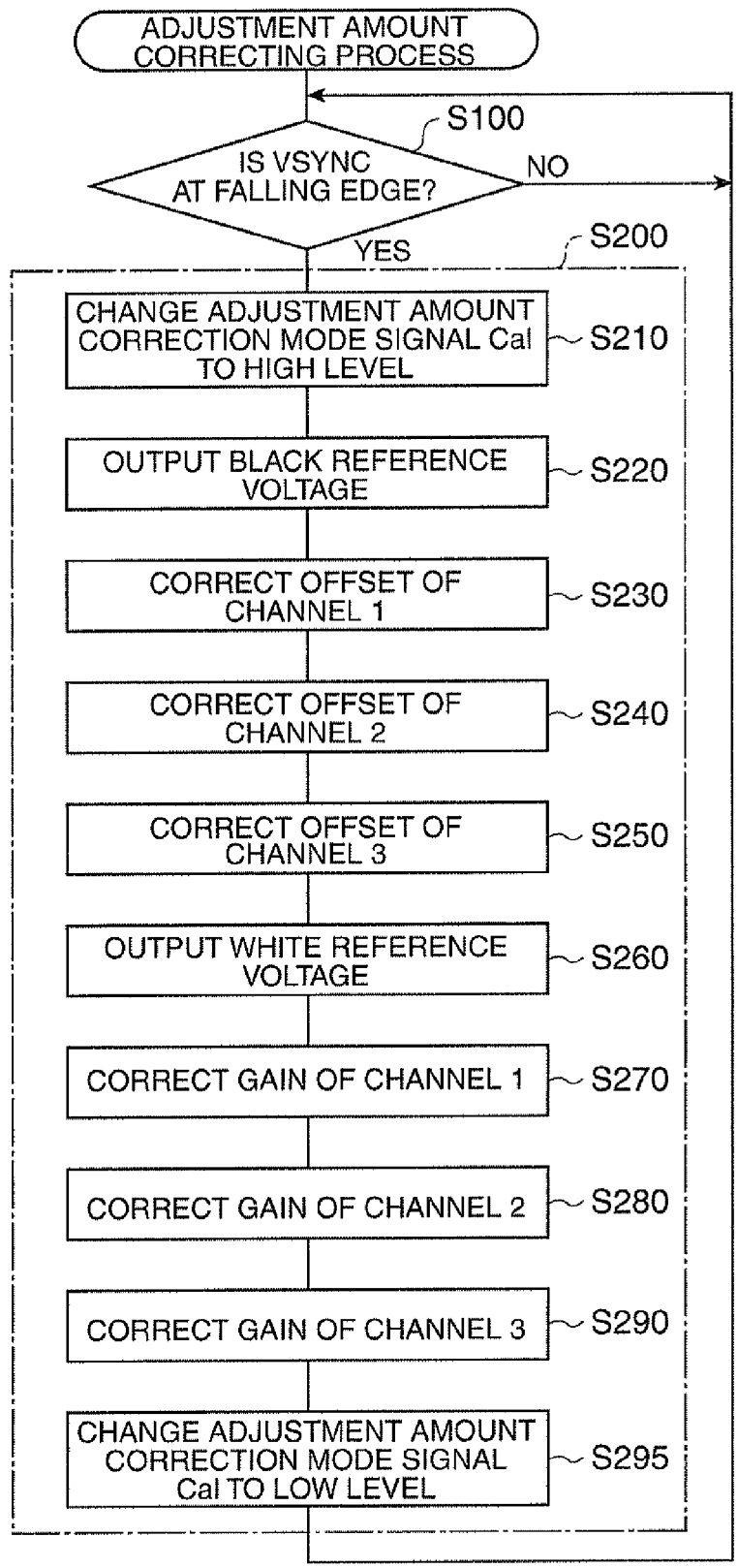
FIG. 3 is a flowchart illustrating an adjustment amount correcting process performed by an adjustment control unit of the image output apparatus.
Figure 4:
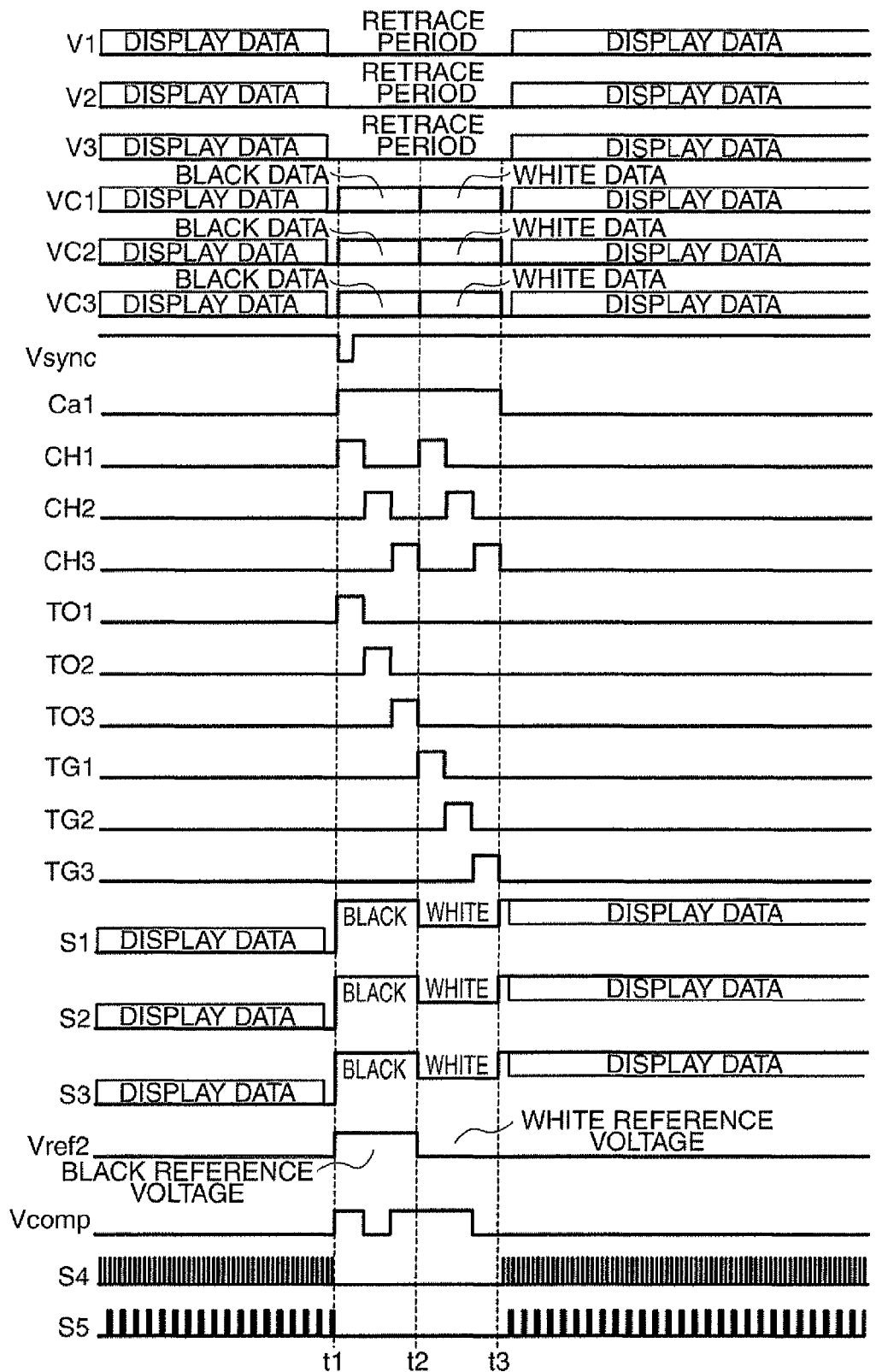
FIG. 4 is a timing chart illustrating a variation in internal signals of the image output apparatus.

Next, the adjustment amount correcting process performed by the adjustment control unit 50 of the image output apparatus 10 will be described. FIG. 3 is a flowchart illustrating the adjustment amount correcting process, and FIG. 4 is a timing chart illustrating a variation in the internal signals of the image output apparatus 10. The adjustment amount correcting process will be described with reference to the flowchart shown in FIG. 3, and the variation in the signals will be described with reference to FIG. 4, if necessary. As described above, the adjustment amount correcting process is performed by a microcomputer (or a logic circuit) forming the adjustment control unit 50. The adjustment amount correcting process starts when the state of a power supply of the image output apparatus 10 is changed from an off state to an on state.

As shown in FIG. 3, when the process starts, a CPU of the microcomputer determines whether the vertical synchronization signal Vsync is at a falling edge (Step S100). When it is determined that the vertical synchronization signal Vsync is not at the falling edge, the process returns to the beginning. On the other hand, when it is determined that the vertical synchronization signal Vsync is at the falling edge (time t1 of FIG. 4), an adjustment amount correction mode process is performed (Step S200).

In the adjustment amount correction mode process in Step S200, the CPU changes the adjustment amount correction mode signal Cal to a high level, and outputs it (Step S210). In addition, the CPU outputs a black reference voltage as the first reference signal Vref1 (Step S220), and adjusts the offset of the channel 1 (Step S230).

When the adjustment amount correction mode signal Cal is changed to the high level in Step S210, the input switches 41, 42, and 43 perform switching to the second state that transmits the first reference signal Vref1 to the D/A converting units 21, 22, and 23, and change the enable signal S4 and the pre-charge timing signal S5 respectively transmitted to the enable signal terminal ENBX and the pre-charge timing signal terminal PreCHG of the liquid crystal display 100 to a low level. As can be seen from the timing chart shown in FIG. 4, at the time t1, the adjustment amount correction mode signal Cal is at a high level, and the enable signal S4 and the pre-charge timing signal S5 are at a low level.

When the input switches 41, 42, and 43 perform switching such that the first reference signal Vref1 is selected in Step S210 and the black reference voltage is output in Step S220, the digital input signals VC1, VC2, and VC3 of the D/A converting units 21, 22, and 23 become the black reference voltages, that is, black data, as shown in FIG. 4.

In Step S230 of adjusting the offset of the channel 1, specifically, the following processes i) to iii) are performed: i) a process of changing the first channel instruction CH1 corresponding to the channel 1 that is transmitted to the output switch 54 to a high level such that the output switch 54 selects the first analog video terminal VID1; ii) a process of outputting the second reference signal Vref2 corresponding to the black reference voltage output in Step S220 to the voltage comparator 52; and iii) a process of outputting the timing signal TO1 to the offset adjusting unit 21c of the first D/A converting unit 21 corresponding to the channel 1.

After the black reference voltage is input to the first D/A converting unit 21 in Step S220, the processes i) to iii) are performed to control the voltage comparator 52 to compare the first analog video output signal S1 (see FIG. 4), which is the output of the first amplifying unit 31 when the black reference voltage is input, with the second reference signal Vref2 corresponding to the black reference voltage. When the level of the first analog video output signal S1 is higher than that of the second reference signal Vref2, the offset adjusting unit 21c decreases the offset of the first D/A converting unit 21 by one step. On the other hand, when the level of the first analog video output signal S1 is lower than that of the second reference signal Vref2, the offset adjusting unit 21c increases the offset of the first D/A converting unit 21 by one step.

The output of the amplifying unit 31 when the black reference voltage is input corresponds to the offset of a first level adjusting unit 11. Therefore, the output is compared with the second reference signal Vref2, and the offset is increased or decreased by a predetermined correction amount such that the difference therebetween is reduced. In this way, it is possible to make the offset of the first level adjusting unit 11 corresponding to the channel 1 close to an offset determined by the second reference signal Vref2.

After Step S230 ends, the CPU performs a process of adjusting the offset of the channel 2 (Step S240). This process is similar to Step S230, but performed for the channel 2. Specifically, the following processes iv) to vi) are performed: iv) a process of changing the second channel instruction CH2 corresponding to the channel 2 that is transmitted to the output switch 54 to a high level such that the output switch 54 selects the second analog video terminal VID2; v) a process of outputting the second reference signal Vref2 corresponding to the black reference voltage output in Step S220 to the voltage comparator 52; and vi) a process of outputting the timing signal TO1 to the offset adjusting unit 22c of the second D/A converting unit 22 corresponding to the channel 2.

As a result of Step S240, it is possible to make the offset of a second level adjusting unit 12 corresponding to the channel 2 close to the offset determined by the second reference signal Vref2. Then, the CPU performs a process of adjusting the offset of the channel 3 (Step S250). This process is similar to Step S230, but performed for the channel 3. Since this process for the channel 3 is the same as those for the channel 1 and the channel 2, a description thereof will be omitted. As a result, it is possible to make the offset of a third level adjusting unit 13 corresponding to the channel 3 close to the offset determined by the second reference signal Vref2. The adjustment amount correction mode process of Step S200 is repeatedly performed to make the offset of each of the first to third level adjusting units 11 to 13 corresponding to the channels 1, 2, and 3 exactly equal to the second reference signal Vref2. As a result, the offset is approximately zero.

As shown in FIG. 4, Step S250 ends in the middle (time t2) of a retrace period (vertical retrace period). Returning to FIG. 3, after Step S250 is performed, the CPU outputs a white reference voltage as the first reference signal Vref1 (Step S260), and performs a process of adjusting the gain of the channel 1 (Step S270). In the process of adjusting the gain of the channel 1 in Step S270, specifically, the following processes vii) to ix) are performed: vii) a process of changing the first channel instruction CH1 corresponding to the channel 1 that is transmitted to the output switch 54 to a high level such that the output switch 54 selects the first analog video terminal VID1; viii) a process of outputting the second reference signal Vref2 corresponding to the white reference voltage output in Step S260 to the voltage comparator 52; and ix) a process of outputting the timing signal TG1 to the gain adjusting unit 21b of the first D/A converting unit 21 corresponding to the channel 1.

After the white reference voltage is input to the first D/A converting unit 21 in Step S260, the processes vii) to ix) are performed to control the voltage comparator 52 to compare the first analog video output signal S1 (see FIG. 4), which is the output of the first amplifying unit 31 when the white reference voltage (white data; see FIG. 4) is input, with the second reference signal Vref2 corresponding to the white reference voltage. When the level of the first analog video output signal S1 is higher than that of the second reference signal Vref2, the gain adjusting unit 21b decreases the gain of the first D/A converting unit 21 by one step. On the other hand, when the level of the first analog video output signal S1 is lower than that of the second reference signal Vref2, the gain adjusting unit 21b increases the gain of the first D/A converting unit 21 by one step.

The output of the amplifying unit 31 when the white reference voltage is input corresponds to the gain of the first level adjusting unit 11. Therefore, the output is compared with the second reference signal Vref2, and the gain is increased or decreased by a predetermined correction amount such that the difference therebetween is reduced. In this way, it is possible to make the gain of the first level adjusting unit 11 corresponding to the channel 1 close to a gain determined by the second reference signal Vref2.

After Step S270 ends, the CPU performs a process of adjusting the gain of the channel 2 (Step S280). This process is similar to Step S270, but performed for the channel 2. Specifically, the following processes x) to xii) are performed: x) a process of changing the second channel instruction CH2 corresponding to the channel 2 that is transmitted to the output switch 54 to a high level such that the output switch 54 selects the second analog video terminal VID2; xi) a process of outputting the second reference signal Vref2 corresponding to the white reference voltage output in Step S260 to the voltage comparator 52; and xii) a process of outputting the timing signal TG1 to the gain adjusting unit 22b of the second D/A converting unit 22 corresponding to the channel 2.

As a result of Step S280, it is possible to make the gain of the second level adjusting unit 12 corresponding to the channel 2 close to the gain determined by the second reference signal Vref2. Then, the CPU performs a process of adjusting the gain of the channel 3 (Step S290). This process is similar to Step S270, but performed for the channel 3. Since this process for the channel 3 is the same as those for the channel 1 and the channel 2, a description thereof will be omitted. As a result, it is possible to make the gain of the third level adjusting unit 13 corresponding to the channel 3 close to the gain determined by the second reference signal Vref2. The adjustment amount correction mode process of Step S200 is repeatedly performed to make the gain of each of the first to third level adjusting units 11 to 13 corresponding to the channels 1, 2, and 3 exactly equal to the second reference signal Vref2. As a result, the offset is approximately zero.

After Step S290 is performed, the CPU changes the adjustment amount correction mode signal Cal to a low level (Step S295) As shown in FIG. 4, the adjustment amount correction mode signal is changed to the low level at a time t3 immediately before the vertical retrace period ends. When the adjustment amount correction mode signal Cal is changed to the low level, the input switches 41, 42, and 43 are changed to the first state that transmits the first to third digital video input signals V1, V2, and V3 to the level adjusting units 11 to 13, respectively, and the mode is switched to the image display mode. In the image display mode, the second input terminal 74b of the first AND circuit 74 and the second input terminal 78b of the second AND circuit 78 are changed to a high level, and the horizontal write enable signal S4 and the pre-charge timing signal S5 can be transmitted to the liquid crystal display 100. After Step S295 ends, that is, after the adjustment amount correction mode process of Step S200 ends, the process returns to Step S100, and this routine is repeatedly performed.

In the image output apparatus 10 having the above-mentioned structure, portions of the level adjusting units 11 to 13 other than the gain adjusting units 21b to 23b and the offset adjusting units 21c to 23c form a "level adjusting unit" according to the embodiment of the invention. The input switches 41, 42, and 43 and the adjustment control unit 50 form a "signal switching unit" according to the embodiment of the invention. The voltage comparator 52, the gain adjusting units 21b to 23b, the offset adjusting units 21c to 23c, and the adjustment control unit 50 form an "adjustment amount correcting unit" according to the embodiment of the invention. In addition, the adjustment control unit 50, the inverter 80, the first AND circuit 74, and the second AND circuit 78 form a "connection state switching unit" according to the embodiment of the invention.

D. Operations and Effects of this Embodiment

In the image output apparatus 10 according to the above-described embodiment, the vertical retrace period is used as the adjustment amount correction mode. During the adjustment amount correction mode, the first reference signal Vref1 is input to the level adjusting units 11 to 13 corresponding to each channel, and the output signal of each of the level adjusting units 11 to 13 is compared with the second reference signal Vref2. Then, the adjustment amounts of the level adjusting units 11 to 13 are corrected on the basis of the comparison results. In addition, in the image output apparatus 10, during the adjustment amount correction mode, the voltages of the enable signal terminal ENBX and the pre-charge timing signal terminal PreCHG of the liquid crystal display 100 are at a low level. In the liquid crystal display 100, when the voltages of both the enable signal terminal ENBX and the pre-charge timing signal terminal PreCHG are at the low level, all the scanning TFTs 170 are turned off. As a result, the analog video terminals VID1, VID2, and VID3 are changed to an open state. That is, in the image output apparatus 10, during the adjustment amount correction mode that corrects the adjustment amounts of the level adjusting units 11 to 13, the analog video terminals VID1, VID2, and VID3 of the liquid crystal display 100 are in the open state.

Therefore, in the image output apparatus 10, during the adjustment amount correction mode, since the level adjusting units 11 to 13 are not electrically connected to the liquid crystal display 100, the load of the output side of each of the level adjusting units 11 to 13 does not vary due to the operation of the liquid crystal display 100. As a result, the image output apparatus 10 can accurately correct a level adjustment amount, and it is possible to sufficiently reduce the display irregularity of the liquid crystal display 100.

In addition, in this embodiment, the first and second AND circuits 74 and 78 are provided on the transmission lines 72 and 76 through which the enable signal and the pre-charge timing signal are transmitted, respectively, and the second input terminals 74b and 78b of the first and second AND circuits 74 and 78 are connected to the output terminal of the inverter 80 that inverts the high/low level of the adjustment amount correction mode signal Cal indicating the adjustment amount correction mode. According to this structure, it is possible to simply achieve a "connection state switching unit" according to the embodiment of the invention. Therefore, it is possible to simplify the structure of the image output apparatus 10.

In this embodiment, the period of the adjustment amount correction mode is within the vertical retrace period. Therefore, it is possible to correct a level adjustment amount without any influence on an image displayed by the liquid crystal display 100. In addition, in this embodiment, the gain adjusting units 21b to 23b and the offset adjusting units 21c to 23c are used to adjust the gains and offsets of the D/A converting units 21, 22, and 23, thereby correcting the adjustment amounts of the level adjusting units 11 to 13. Therefore, it is not necessary to provide a dedicated level adjustment amount correcting circuit, which results in a simple structure.

E. Modifications

The invention is not limited to the above-described embodiment, but various modifications and changes of the invention can be made without departing from the scope and spirit of the invention. For example, the following modifications can be made.

E1. First Modification

In the above-described embodiment, the liquid crystal display 100 divides a screen into three channels and drives the divided channels. However, the liquid crystal display may divide the screen into a plurality of channels other than three, such as 2, 6, and 12 channels, and drive the divided channels. In this case, the image output apparatus includes level adjusting units whose number corresponds to the number of channels. In addition, the liquid crystal display may divide the screen in the vertical direction, instead of the horizontal direction.

E2. Second Modification

In the above-described embodiment, the period of the adjustment amount correction mode, that is, a "predetermined period" according to the embodiment of the invention is the vertical retrace period. However, the period of the adjustment amount correction mode is not necessarily the vertical retrace period, but it may be another period, such as a horizontal retrace period. In addition, the period of the adjustment amount correction mode is substantially equal to the vertical retrace period. However, the period of the adjustment amount correction mode is not necessarily substantially equal to the entire vertical retrace period, but it may be a portion of the vertical retrace period.

E3. Third Modification

In the above-described embodiment, during the adjustment amount correction mode, the enable signal is changed to an inactive level, and the pre-charge timing signal is changed to an inactive level. However, in a structure in which the liquid crystal display device does not perform pre-charge, that is, in a structure in which the pre-charge timing signal terminal PreCHG and the OR circuits 161 to 16n are not provided, it is possible to turn off the scanning TFT 170 only by changing the enable signal to an inactive level. Therefore, during the adjustment amount correction mode, the image output apparatus may change only the enable signal to an inactive level. In addition, during the adjustment amount correction mode, the image output apparatus does not necessarily change the enable signal to the inactive level. The image output apparatus may change a control signal for turning off the scanning TFT 170 to an inactive level. Specifically, the image output apparatus may have any structure as long as it can output a control instruction to change connection terminals for each channel of the liquid crystal display that are connected to the output terminals of the level adjusting units to an open state. In addition, the liquid crystal display may include a MOS transistor as the connection state switching unit, instead of the TFT. The MOS transistor may also be used instead of the pixel TFT. Further, the liquid crystal display may be driven by a simple matrix driving method, instead of the active matrix driving method.

E4. Fourth Modification

In the above-described embodiment, the gains and offsets of the D/A converters 21a, 22a, and 23a are adjusted to correct the adjustment amount for adjusting the level of an input signal. However, only one of the gain and the offset may be adjusted. In addition, in the above-described embodiment, the output signal of each of the level adjusting units 11 to 13 when the first reference signal Vref1 is input is compared with the second reference signal Vref2, and the adjustment amounts of the corresponding level adjusting units 11 to 13 are increased or decreased by a predetermined correction amount such that the difference between the signals is reduced. However, after the comparison is performed, a correction amount may be changed on the basis of the difference between the signals, and the gain or offset may be increased or decreased by the correction amount. Further, the invention is not limited to the structure in which the adjustment amount of the D/A converter is changed. However, any structure may be used as long as it can correct the adjustment amount of the level adjusting unit.

E5. Fifth Modification

The above-described embodiment includes the image output apparatus 10 and the liquid crystal display 100. However, the invention may be applied to a projector. That is, the liquid crystal display 100 may be used as a liquid crystal panel, which is one of the parts of the projector, and the image output apparatus 10 may be provided in the projector.

In the above-described embodiment, a portion of the structure implemented by hardware may be replaced with software. Conversely, a portion of the structure implemented by software may be replaced with hardware.

What is claimed is:

1. An image output apparatus comprising:
    a display device having a light modulation section which is divided into a plurality of channels;
    a level adjusting unit that is provided to each of the channels, adjusts a level of input signal, and outputs adjusted output signal to corresponding channel;
    a signal switching unit that switches between a video input signal and a first reference signal as the input signal of the level adjusting unit within a predetermined period;
    an adjustment amount correcting unit that compares an output signal from each of the level adjusting units with a second reference signal for the predetermined period and corrects the adjustment amounts of the corresponding level adjusting units on the basis of the comparison results; and
    a connection state switching unit that outputs a control instruction to the display device to change a state of all the channels to an open state for the predetermined period.

2. The image output apparatus according to claim 1,
    wherein the display device further comprises:
        an active matrix unit that has a plurality of scanning lines extending in one direction and a plurality of signal lines extending in another direction arranged in a matrix on a substrate, and pixel electrodes and switching elements formed at intersections of the scanning lines and the signal lines;
        a plurality of connection lines that classify the plurality of signal lines according to the number of channels;
        a plurality of connection terminals that are connected to the connection lines; and
        a plurality of connection line conduction switches that are provided to correspond to the plurality of connection lines and control electrical connection to the connection terminals, and
        the connection state switching unit outputs a control instruction to the display device to change the connection line conduction switches to an open state.

3. The image output apparatus according to claim 2, further comprising:
    a display timing generating unit,
    wherein the display device further includes an enable signal terminal that receives an enable signal for controlling the output of the video signals to the plurality of signal lines,
    the display timing generating unit outputs the enable signal to the enable signal terminal, and
    the connection state switching unit of the image output apparatus includes a first off switching unit that changes the enable signal to an inactive level for the predetermined period.

4. The image output apparatus according to claim 3,
    wherein the display device further comprises:
        a pre-charge timing signal terminal that receives a pre-charge timing signal for controlling the on/off states of the plurality of connection line conduction switches, wherein
        the display timing generating unit includes a unit that outputs the pre-charge timing signal to the pre-charge timing signal terminal, and
        the connection state switching unit of the image output apparatus includes a second off switching unit that changes the pre-charge timing signal to an inactive level for the predetermined period.

5. The image output apparatus according to claim 4, further comprising:
    an adjustment amount correction mode signal output unit that outputs an adjustment amount correction mode signal indicating whether it is the predetermined period,
    wherein the first off switching unit is a first AND circuit having a first input terminal connected to an enable signal output terminal of the display timing generating unit, a second input terminal connected to an output terminal of the adjustment amount correction mode signal output unit, and an output terminal connected to the enable signal terminal, and
    the second off switching unit is a second AND circuit having a first input terminal connected to a pre-charge timing signal output terminal of the display timing generating unit, a second input terminal connected to the output terminal of the adjustment amount correction mode output unit, and an output terminal connected to the pre-charge timing signal terminal.

6. The image output apparatus according to claim 1,
    wherein the predetermined period is within a vertical retrace period.

7. The image output apparatus according to claim 1,
    wherein each of the level adjusting units includes a digital/analog converter that converts the video input signal, which is a digital signal, into an analog signal, and adjusts at least one of the gain and the offset of the digital/analog converter to adjust a level.

8. A projector comprising:
    the image output apparatus according to claim 1.

9. A method of controlling an image output apparatus that outputs video signals to a display device having a light modulation screen divided into a plurality of channels and driving the divided channels and includes a level adjusting unit which is provided to each of the channels, adjusts a level of a video input signal for each channel, and outputs adjusted output signal to connection terminals for each channel of the display device, the method comprising:
    outputting a control instruction to change all of the connection terminals to an open state to the display device for a predetermined period;
    inputting a first reference signal to each of the level adjusting units, instead of the video input signal, for the predetermined period; and
    comparing an output signal from each of the level adjusting units with a second reference signal for the predetermined period and correcting the adjustment amounts of the corresponding level adjusting units on the basis of the comparison results.

* * * * *